Sept. 10, 1968     J. M. MIZENKO     3,400,572

SEAL EVALUATION TEST FIXTURE

Filed Feb. 17, 1967     2 Sheets-Sheet 1

INVENTOR
JOHN M. MIZENKO

Floyd C. Harman

ATT'Y

Sept. 10, 1968　　　　　J. M. MIZENKO　　　　　3,400,572
SEAL EVALUATION TEST FIXTURE
Filed Feb. 17, 1967　　　　　　　　　　　　　　2 Sheets-Sheet 2

INVENTOR
JOHN M. MIZENKO
Lloyd B. Harman
ATT'Y

United States Patent Office 3,400,572
Patented Sept. 10, 1968

3,400,572
SEAL EVALUATION TEST FIXTURE
John M. Mizenko, Palos Heights, Ill., assignor to International Harvester Company, Chicago, Ill., a corporation of Delaware
Filed Feb. 17, 1967, Ser. No. 616,813
7 Claims. (Cl. 73—37)

ABSTRACT OF THE DISCLOSURE

A test fixture, for use in evaluating sealing materials, having uniform pressure loading characteristics by employing a single calibrated bolt equipped with an electric strain gauge installed in the shank thereof for accurately controlling the pressure exerted upon the sealing materal.

BACKGROUND OF THE INVENTION

This invention relates to apparatus used in the art of determining and evaluating sealability and relaxation characteristics of sealing materials. More in particular this invention relates to the construction of a test fixture employing, in combination, a single bolt for attaining uniform pressure on the sealing material, and wherein the bolt is equipped with a calibrated electric strain gauge for accurately controlling the tension on the bolt which tension is a measure of force applied to compress the sealing material. Moreover this test fixture is adapted for evaluating the sealability and relaxation characteristics of sealing materials per se rather than in the form of a shaped product.

Heretofore, test fixtures for sealability investigations of sealing materials, such as gasket and coating compositions, were designed to be assembled using loading means such as a plurality of peripherally disposed bolts or screws. This resulted in the disadvantage of having non-uniform pressure applied to the sealing composition under test because such bolts or screws frequently may not be equally tensioned. Fluid presses have also been used for applying pressure to the sealing composition. However this requires relatively large and expensive equipment with its attendant controllable source of fluid pressure which makes it impractical to conduct tests in other than an ambient temperature. Furthermore test fixtures for determining sealability have heretofore been separate from test fixtures for determining relaxation characteristics of such materials.

In order to overcome the above-mentioned disadvantages this invention is directed to the construction of a relatively small sized test fixture for use in determining both sealability and relaxation characteristics of sealing compositions, such as gaskets, wherein pressure is applied uniformly to the material under test by means of a single bolt and such bolt is equipped with an electric strain gauge calibrated so that the magnitude of applied pressure is accurately controlled.

SUMMARY

In view of the foregoing it is therefore a prime object of the present invention to provide a single test fixture for use in evaluating sealing compositions to determine respectively their characteristics relating to sealability and relaxation which ensures uniform pressure of predetermined magnitude applied to the composition being tested.

A further object of the invention is to provide a test fixture wherein the aforesaid uniform pressure of predetermined magnitude may be accurately indicated or controlled.

Still a further object of the invention is to provide the test fixture, according to the preceding objects, having small dimensions suitable for use in a temperature controlled atmosphere, such as ovens or refrigerators, whereby sealing compositions may be tested under controlled temperature conditions.

These and other desirable objects inherent in and encompassed by the invention will become more apparent from the ensuing description of a preferred embodiment, the appended claims, and the annexed drawing.

BRIEF DESCRIPTION OF THE PREFERRED EMBODIMENT

Figure 1:
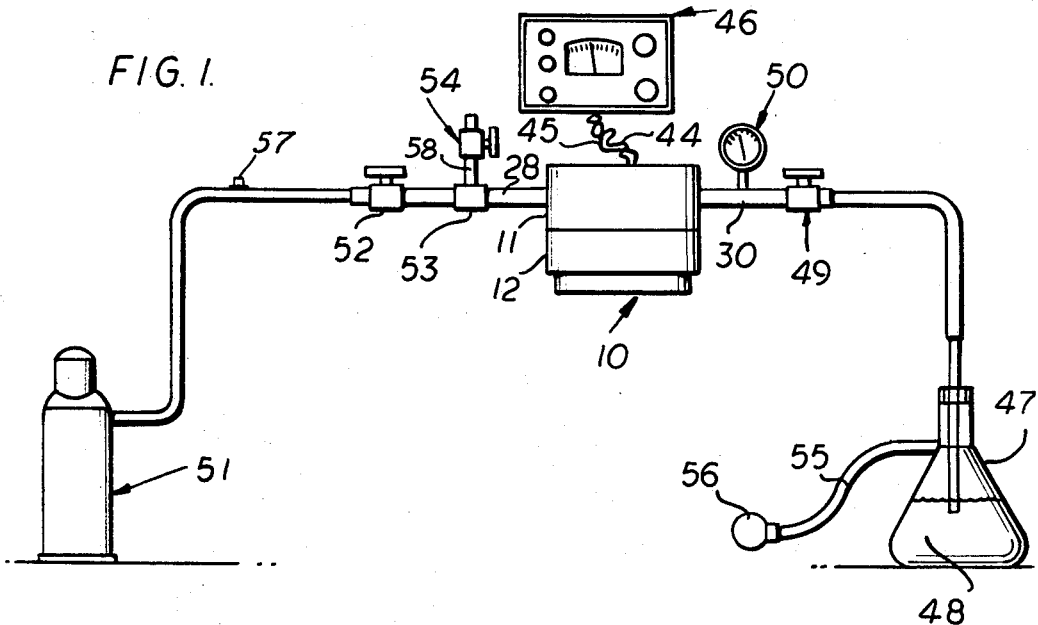
FIGURE 1 is a schematic view of the test fixture of this invention with ancillary components arranged for determining sealability of sealing compositions.
Figure 2:
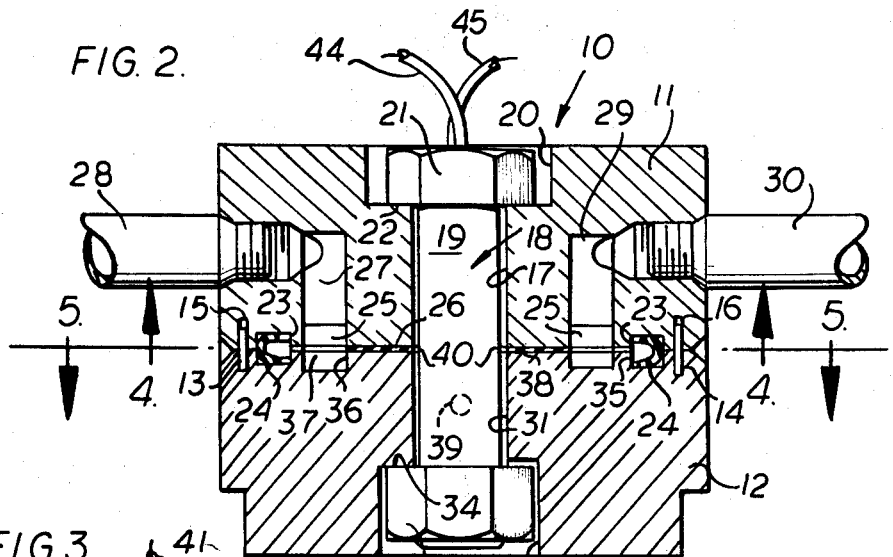
FIGURE 2 is a vertical section taken coincidental with the vertical axis of the test fixture of this invention.

With continued reference to the drawing the numeral 10 in FIGURES 1 and 2 indicates the test fixture embodying the novel features of the present invention. The fixture 10 includes an upper platen 11 and a lower platen 12. The platens 11 and 12 fit together in complementary relation as indicated in FIGURE 2. For purpose of locating the platen 11 with respect to the platen 12, the platen 12 is provided with a pair of locating pins 13 and 14 extending upwardly from the upper plane surface thereof. In complementary relation with the pins 13, 14 the underside surface of the upper platen 11 is provided with a pair of bores 15 and 16 thus locating the upper platten 11 in a fixed position with respect to the lower platen 12.

The upper platen 11 is provided with a centrally disposed bore 17 of relatively large diameter to accommodate the shank 19 of a calibrated bolt 18 of hard steel or other suitable metal equipped with an electric strain gauge hereinafter described. In the upper portion of the platen 11 there is provided a circular recess or bore 20 in concentric relation with the bore 17 for the purpose of accommodating the head 21 of the bolt 18 as shown best in FIGURE 2. From this it will be apparent that the head 21 of the bolt 18 engages the platen 11 at the shoulder 22 formed by the bores 17 and 20. The diameter of the bore 20 should be sufficiently large so that the recess formed may accommodate a suitable type socket wrench adapted to fit the head 21 of the bolt 18.

Figure 6:
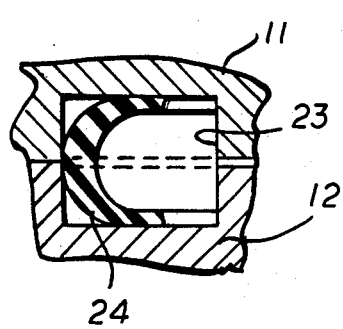
FIGURE 6 is an enlarged vertical sectional view, partly broken away, showing the installed position of the elastomeric sealing ring component in the test fixture of FIGURE 2.

Concentric with the bore 17 the platen 11 is provided with an upper ring groove 23 to accommodate the upper portion of an elastomeric sealing ring 24 as shown in FIGURES 2 and 6.

Figure 4:
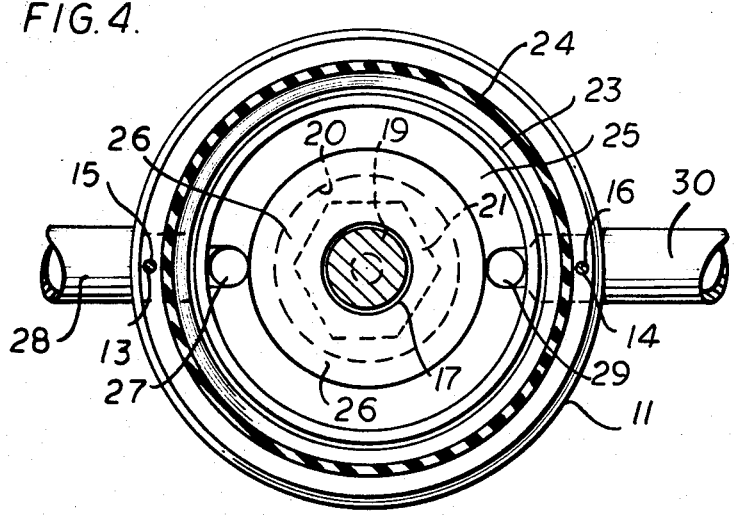
FIGURE 4 is a sectional view partly broken away, taken along the line 4–4 of FIGURE 2 with test specimen omitted showing additional construction details of the upper platen of the test fixture.

Concentric with the bore 17 and ring groove 23 the platen 11 is provided with a first annular groove 25 as illustrated in FIGURES 2 and 4. The first annular groove 25 forms with the bore 17 a first flat annular face 26.

For convenience it is suggested that the dimensions of the first annular groove 25 and the bore 17 be selected so that the total area of the first flat annular face to be equal to a digital unit of area or multiple thereof; e.g. 2 square inches.

The first annular groove 25 is provided with a passage 27 which is communicatively connected to a pressure inlet conduit 28 as shown in FIGURES 2 and 4 of the drawing. In a similar manner a passage 29 in the platen 11 is provided for communicatively connecting the first annular groove 25 with the fluid charging conduit 30 for purpose hereinafter described.

Figure 5:
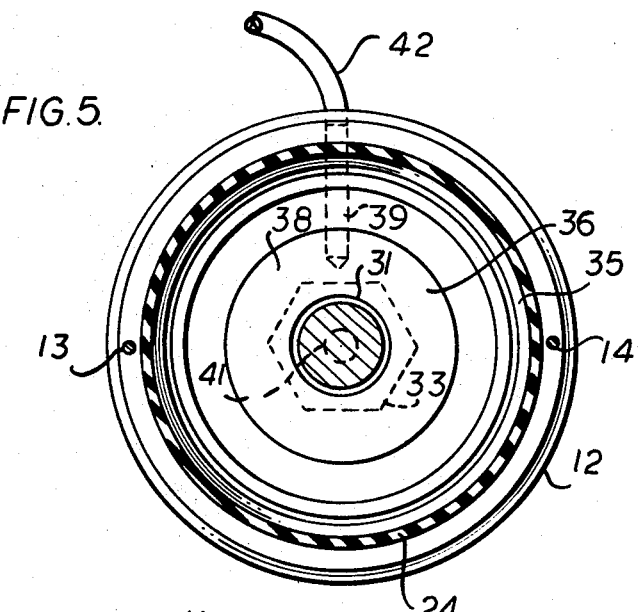
FIGURE 5 is a sectional view, partly broken away, taken along the line 5–5 of FIGURE 2 with test specimen omitted illustrating further details of the lower platen of the test fixture.

The lower platen 12 is provided with a centrally disposed bore 31 coextensive with the bore 17 of the upper platen 11 to accommodate the lower portion of the shank 19 of the calibrated bolt 18 as shown in FIGURES 2 and 5 of the drawing. The lower portion of the platen 12 includes a circular recess or bore 32 to accommodate the nut 33 which nut is threadedly adapted to receive the lower shank 19 of the calibrated bolt 18 in conventional thread relation. The nut 33 engages the platen 12 at the shoulder 34 formed by the bores 31 and 32 as is evident from FIGURE 2.

Concentric with the bore 31 the platen 12 is provided a lower ring groove 35 to accommodate the lower portion of the aforementioned elastomeric sealing ring 24. Thus, as shown in FIGURE 2 the lower ring groove 35 cooperates with and is complementary to the upper ring groove 23 of the platen 11 forming an annular shaped compartment for confining the elastomeric sealing ring 24.

Concentric with the bore 31 and lower ring groove 35 the platen 12 is provided with a second annular groove 36 as illustrated in FIGURES 2 and 5 of the drawing. From FIGURE 2 it will be seen that when the test fixture 10 is assembled the second annular groove 36 of the platen 12 cooperates with and is complementary to the first annular groove 25 of the platen 11 forming an annular chamber 37 communicatively connected to the conduits 28 and 30.

The second annular groove 36 forms with the bore 31 a second flat annular face 38 which cooperates with and is complementary to the first annular face 26 of the upper platen 11 and, of course, both faces 26 and 38 are equal to each other with respect to area.

The lower platen 12 is also provided with a transverse bore 39 as a well for a conventional electric thermocouple (not shown) for measuring the temperature of the test fixture 10 and its associated annular shaped specimen of material under test 40 (FIGURE 2). The attached tube 42 (FIGURE 5) may conveniently be provided for housing the electric conductors (not shown) leading to the aforesaid thermocouple. Alternately the tube 42 may be removed and an ordinary mercury thermometer may be inserted in the bore 39.

Figure 3:
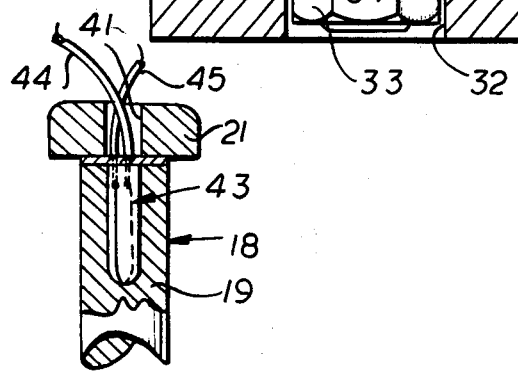
FIGURE 3 is a sectional view, partly broken away, taken along the vertical axis of the clamping bolt in the fixture of FIGURE 2 illustrating the electric strain gauge installed therein.

Referring now to FIGURE 3 the calibrated bolt 18 is provided with a longitudinal bore 41 extending through the head 21 and a portion of the adjacent shank 19 thereof. Within the bore 41 is installed an electric strain gauge, indicated generally at 43, in a conventional manner such as that illustrated and described in U.S. Patent No. 2,873,341 issued on Feb. 10, 1959 to A. U. Kutsay. The strain gauge 43 is electrically connected to the conductor leads 44 and 45 which in turn are connected to a conventional digital strain indicator, generally shown at 46 in FIGURE 1, such as, for example, Model P–350 commercially produced and sold by the Budd Company of Phoenixville, Pa.

As a preliminary step prior to the first use of the test fixture 10, the bolt 18 and its associated strain gauge assembly 43 must be calibrated so that the magnitude of tension longitudinally exerted upon the shank 19 can be accurately determined by reading the digital strain indicator 46. This calibration may be accomplished by any conventionally known methods and accordingly will not be further described here.

In use an annularly shaped pre-cut specimen of material for test 40 having dimensions adapted to fit between the first and second annular flat faces 26 and 38 is inserted between both faces and the test fixture is then assembled as shown in FIGURE 2. If the material 40 for test is of a liquid type, such material may be coated upon one or both of the faces 26, 38 as desired prior to assembly. The specimen 40 may be conditioned prior to test with procedures such as, for example, set forth with American Society for Testing Materials standard D–1170. The assembled test fixture 10 is connected for sealability test as shown schematically in FIGURE 1. The fluid charging conduit 30 leads to a liquid reservoir 47 which may conveniently be an ordinary chemical laboratory filter flask. The liquid test medium 48 should be selected with due consideration of the composition of the material 40 under test. For example liquid iso-octane has been successfully used.

Interposed in the conduit 30 is a shutoff valve 49 and a pressure gauge 50 as shown in FIGURE 1.

The gas pressure inlet conduit 28 leads to a source of gas under regulated pressure 51. For example the source 51 may conveniently be a cylinder of air under high pressure with a conventional pressure regulating valve (not shown).

Interposed in the pressure inlet conduit is a gas inlet valve 52. Also interposed in the pressure inlet conduit 28 is a T type pipe fitting extending upwardly with a bleed valve 54 positioned on the upper end thereof, as shown in FIGURE 1, for a purpose hereinafter described.

The following represents one method of evaluating the sealability of a given sealing composition test specimen 40.

After the specimen 40 is inserted and the test fixture 10 assembled as in FIGURE 2, the calibrated bolt 18 is stressed to a predetermined magnitude in tension, e.g. 1000 lbs., as read on the digital strain indicator 46. If the area of the specimen 40 is two square inches the compressive stress upon the specimen 40 would then be 500 p.s.i. Stressing the calibrated bolt 18 is, of course, accomplished by rotating the head 21 with respect to the nut 33 in the clamping direction. In some instances the stressing of the bolt 18 should be accomplished within a given period of time, e.g. 8–12 seconds. It will be noted here that the specimen 40 is uniformly compressed under the clamping action of the calibrated bolt 18. This uniformity of compression and simplicity for obtaining it are unique features of this invention. The test fixture is then tilted slightly so that the shutoff valve 49 is below the inlet valve 52.

Next open valves 49 and 52 and close the bleed valve 54. Remove the plug 57 from the gas pressure inlet conduit 28. Using the bulb 56 as a source of air at low pressure, manually pump liquid medium from the reservoir 47 into the test fixture 10. When the liquid medium reaches the gas inlet valve 52 close both valves 49 and 52 and replace the plug 57. At this time the annular chamber 37 in the test fixture 10 will be filled with the liquid medium 48 including passages 27 and 29. Likewise the conduit 30 between the test fixture 10 and valve 49 will be filled with liquid medium 48. Similarly the conduit 28 between the test fixture 10 and the valve 52 will be filled with liquid medium 48. However the tube 58 between the T type pipe fitting 53 and the bleed valve 54 forms a small gas pocket which serves as a small volume compression chamber as will be apparent later.

Next the source of gas under regulated pressure (e.g. 90 p.s.i.) is opened as well as the valve 52. The annular chamber 37 is now under a liquid pressure of regulated magnitude indicated on the pressure gauge 50. It will now be apparent that the liquid under pressure in the annular chamber 37 is acting upon the specimen of material under test 40 in a radial direction toward the bores 17 and 31 which are at atmospheric pressure. The elastomeric sealing ring 24 prevents any leakage of the liquid medium 48 from the annular chamber 37 radially in an outward direction. Hence any leakage from the annular chamber 37 must pass through the specimen under test 40.

The gas inlet valve 52 is then closed and a fixed period is allowed to lapse (e.g. 5 minutes) after which the pressure in the annular chamber 37 is read from the pressure gauge 50. If a predetermined maximum pressure loss occurs (e.g. 10% pressure drop) the material is said to be incapable of sealing at the compressive stress fixed by the predetermined tension on the calibrated bolt 18. The test is repeated using new specimens 40 at different values of the tension on the calibrated bolt 18 until the minimum unit pressure value is obtained at which the specimen 40 effectively seals at the selected pressure of the source 51. Of course sealability tests may be conducted under controlled temperature conditions by placing the test fixture 10 in a suitable temperature controlled oven or refrigerator (not shown) and measuring the temperature by a thermocouple or thermometer in the well 39 in a conventional manner.

Since liquids are considered, for practical purpose, as herein discussed, to be essentially incompressible the gas pocket in the tube 58 serves as an expansion chamber so that an extremely slight leakage of the liquid medium 48 through the test specimen 40 does not result in a rapid pressure drop on the pressure gauge 50. Of course the volume of the gas pocket in the tube 58 should not be too large as in such case a relatively large leakage of the fluid medium 48 through the test specimen 40 would be required to observe a noticeable drop in pressure at the gauge 50.

In testing sealing materials for their relaxation characteristics only the test fixture 10 and its associated digital strain indicator 46 is required together with, if desired, suitable temperature controlled means such as an oven or refrigerator.

The test specimen 40 is inserted and the test fixture 10 is assembled as above described. Next the calibrated bolt 18 is tensioned to a magnitude necessary to compress the specimen to a predetermined value (e.g. 2000 p.s.i.). Then the test fixture is subjected to the temperature controlled medium, if desired, for a predetermined period (e.g. 20 hours.) The test fixture 10 and its specimen 40 are then subjected to room temperature for a predetermined period to normalize (e.g. 4 hours). Then the tensile stress on the calibrated bolt 18 is measured by the digital strain indicator 46. The loss in compressive stress on the specimen 40, expressed in percentage, based on the initial compressive stress is a measure of the amount of relaxation or flow of the material 40 under the test temperature.

Having thus described a preferred embodiment of the invention, it can now be seen that the objects of the invention have been fully achieved and it must be understood that changes and modifications may be made which do not depart from the spirit of the invention as disclosed nor from the scope thereof as defined in the appended claims.

What is claimed is:

1. A test fixture for evaluating the sealability and relaxation characteristics of a sealing material test specimen comprising:
   (a) an upper platen having a centrally disposed longitudinal first bore,
   (b) a first groove concentric with said first bore forming a first flat face on said upper platen for engaging one side of said test specimen,
   (c) at least one fluid passage in said upper platen positioned for communicatively connecting said first groove with a source of fluid under pressure,
   (d) a lower platen having a centrally disposed longitudinal second bore positioned to cooperate with said first bore in coextensive relation,
   (e) a second groove concentric with said second bore positioned to cooperate with said first groove in complementary relation to form a chamber to accommodate a fluid medium under pressure from said source,
   (f) said second groove forming a second flat face on said lower platen positioned to complement said first flat face for engaging the other side of said test specimen,
   (g) a calibrated bolt having a shank extending through said first and second bores with a nut in cooperative relation positioned to engage said upper platen with said lower platen in clamping relation,
   (h) and means for controllably tensioning said calibrated bolt with said nut for compressing said test specimen to a compressive stress of predetermined magnitude.

2. A test fixture according to claim 1 wherein said first and second grooves are annular shaped.

3. A test fixture according to claim 1 wherein said calibrated bolt includes an electric strain gauge connected to an electric strain indicator for determining the tensile stress applied to said bolt and corresponding compressive stress applied to said test specimen.

4. A test fixture according to claim 1 wherein said calibrated bolt and nut are constructed essentially of hardened steel.

5. A test fixture according to claim 1 wherein said upper platen is provided with a first ring groove positioned to encompass said first groove, and said lower platen is provided with a second ring groove positioned to cooperate with said first ring groove in complementary relation, and a sealing element positioned in the compartment formed by said ring grooves for preventing leakage therethrough of said fluid medium from said chamber.

6. A test fixture according to claim 1 wherein one of said platens is provided with a well for accommodating temperature indicating means for determining the temperature of said platens at a position adjacent to said flat faces and said test specimen.

7. A test fixture according to claim 5 wherein said sealing element is constructed of a resilient elastomeric composition.

References Cited

UNITED STATES PATENTS

| 2,360,866 | 10/1944 | Osterberg | 73—88.5 |
| 2,958,056 | 10/1960 | Giovanni | 73—88.5 |
| 3,151,258 | 9/1964 | Sonderegger et al. | |
| 3,188,855 | 6/1965 | Dega | 73—37 |
| 3,212,325 | 10/1965 | Katz et al. | 73—88.5 |

S. CLEMENT SWISHER, *Acting Primary Examiner.*

WILLIAM HENRY II, *Assistant Examiner.*